Nov. 2, 1971  JEAN RENÉ BENNER  3,616,762
OVERHEAD CONVEYOR SYSTEM
Filed Sept. 16, 1969  3 Sheets-Sheet 1
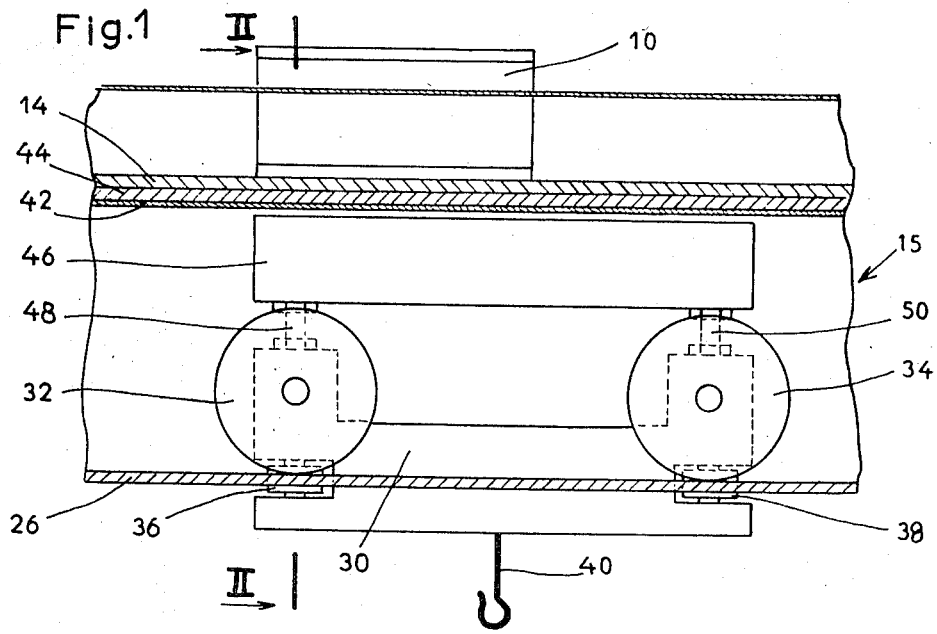
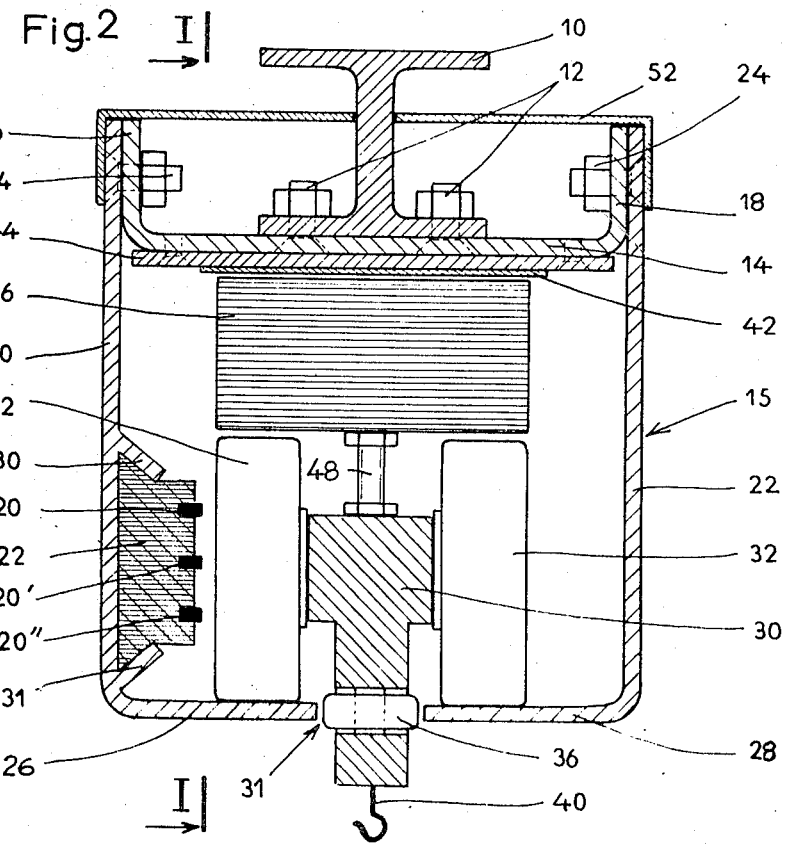

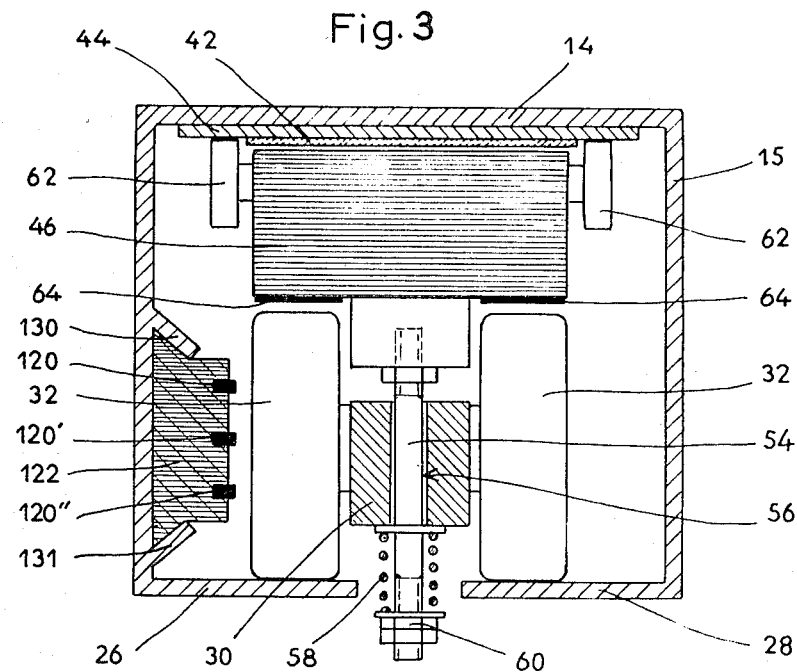
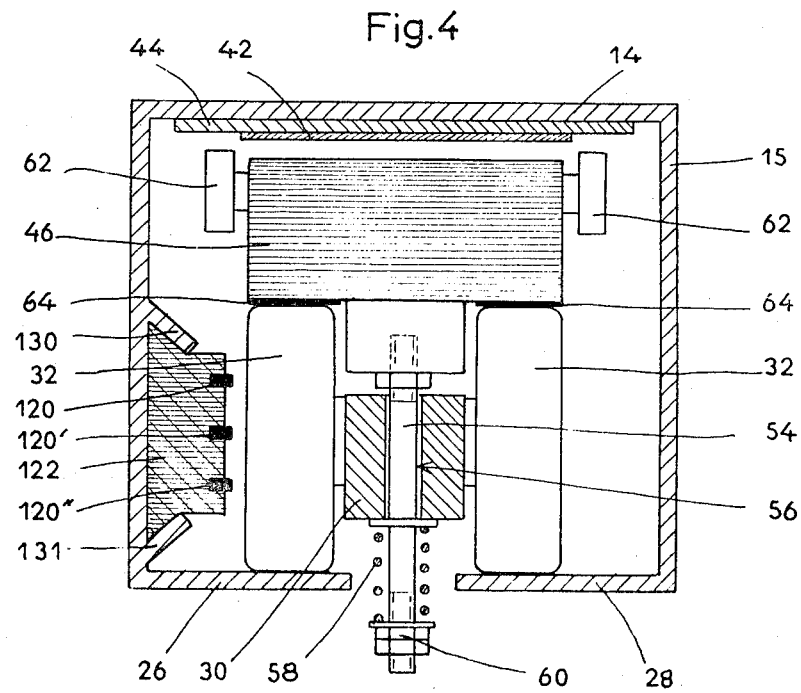

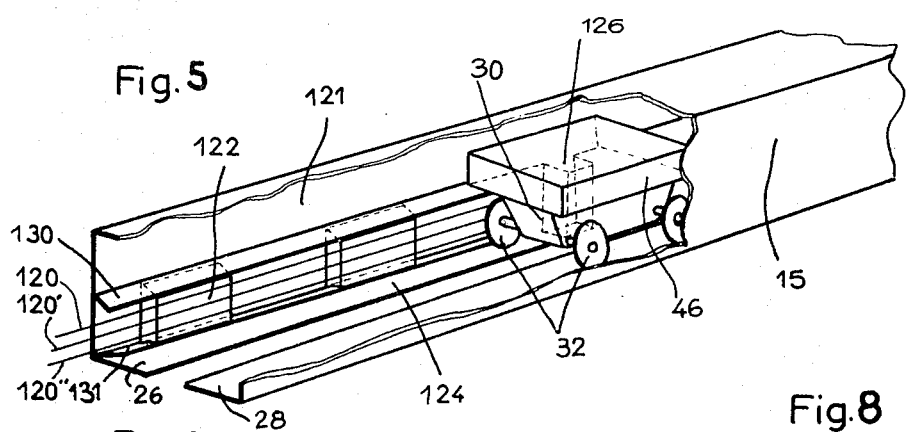
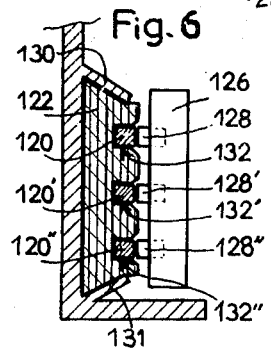
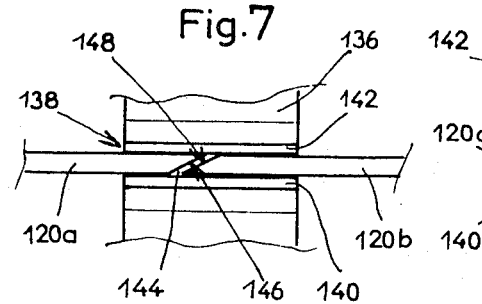
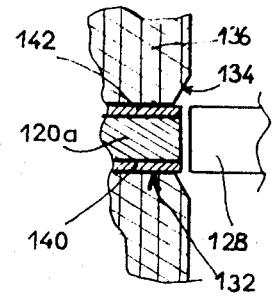
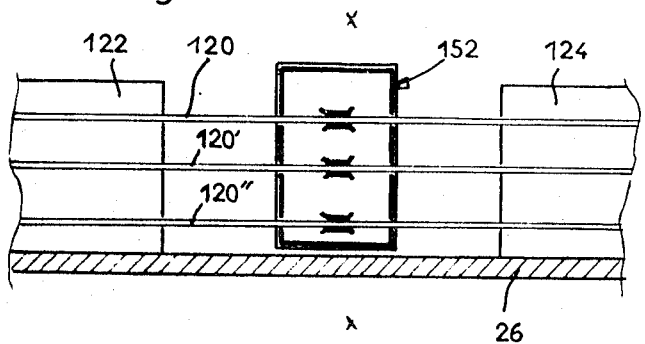
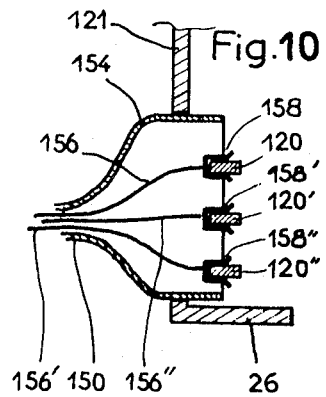

3,616,762
OVERHEAD CONVEYOR SYSTEM
Jean-René Benner, Courtry, France, assignor to Linerail, manutention par moteur lineaire, Neuilly, France
Filed Sept. 16, 1969, Ser. No. 858,272
Claims priority, application France, Sept. 25, 1968, 167,424; Oct. 17, 1968, 170,196; Apr. 15, 1969, 6910168
Int. Cl. B60l 9/18, 13/00
U.S. Cl. 104—148 LM    6 Claims

ABSTRACT OF THE DISCLOSURE

Overhead conveyor system with self-propelled truck driven by an electrical linear induction motor along an overhead track of rectangular box-like section with a longitudinal slot in the bottom wall. The top wall of the track forms the armature of the linear motor and the inductor is borne by the truck. Positioning rollers provide a constant gap between the inductor and the armature of the motor.

---

The present invention relates to a conveyor system with overhead track in the form of a beam or rail, currently known as a monorail, in which a self-propelled load-holding or supporting truck travels along the track rolling on runways provided on the side flanges of the track or rail.

The propulsion of trucks or wheeled carriages by a rotating electric motor associated with each truck involves a transmission of the movement by the roller or rollers bearing the trucks and is therefore subject to their adherence to the track. The size of the motors and of the associated reducing mechanisms do not permit a compact construction of the trucks and thus their displacement within a tubular or box beam.

The object of the present invention is to provide a simple, robust handling device of absolutely dependable operation, all the parts thereof being contained within the track.

The conveyor system or handling device in accordance with the invention is characterized by the fact that the overhead track consists of a tubular rail of rectangular box-like section having a longitudinally extending central slot in its bottom wall the flange lips lying on both sides of said slot forming a double runway for the rollers of a truck moving within said tubular rail under the action of a linear motor the armature element of which is formed of or is rigidly connected with the ceiling or top wall of the said track.

The electrical function of the track is thus assured by the portion constituting the top wall or ceiling of the tubular rail, while the mechanical function of supporting and guiding the truck is assured by the lateral flange lips.

In accordance with a preferred embodiment of the invention, the conveyor system furthermore comprises positioning members for the inductor element borne by the said truck with respect to the said armature element in active position of the motor in order to provide a constant gap between the said inductor and armature elements and means for fastening the inductor element to said truck which are arranged to permit lateral displacement of the inductor element on said truck relative to the longitudinal direction of the track. The movable mounting of the inductor on the truck makes it possible to maintain a constant gap whatever the spacing between the runways and the ceiling of the track forming the armature, and therefore to be independent of any irregularity or deformation of the track.

The side walls and the bottom wall flanges of the said tubular track are advantageously formed of two L-shaped profiles which face each other and are fastened to the top wall of the track so as to provide the said slot or gap between the runways formed by the said flanges.

When the conveyors are driven by linear motors, in case of a failure of current, they decelerate only under the action of the frictional forces due to the rolling of the wheels of the trucks on the track. Thus a truck provided with a linear motor having a speed of two meters per second and a coefficient of friction of 0.01 would stop, on the level, within a distance of twenty meters.

In order to avoid this drawback, and in accordance with another characteristic of the invention, the truck is provided with brake shoes which are brought by gravity or elastically into their active position and are connected to the inductor element borne by the truck in such a manner that they are displaced against the action of their return means and held in inactive position by the displacement of the said energized inductor element. For this purpose, the armature comprises a ferromagnetic element and the force of attraction between armature and inductor of the motor is utilized for the unlocking of the brake shoes.

These braking means can be made in many ways, and it is possible to neutralize them if desired—for instance to carry out repair or maintenance work on the conveyor.

The tubular construction of the track lends itself particularly well to a feeding of the trucks with electricity with perfect safety by providing on one of the inner faces of the said beam-shaped track or rail stationary feed conductors extending along the said track, with which there cooperate current pick-up means borne by the said movable trucks. The conductors are fastened to the track by insulating supports which permit easy mounting and maintenance.

In accordance with one feature of the invention, the feed device comprises insulating supports of elastic or flexible material staggered along the said track, the side of which facing the said pick-up devices having longitudinal notches capable of receiving with tight fit the said feed conductors which are held therein by the forces of friction, the contact pressure exerted by the said pick-up devices urging the conductors all the way into the said notches.

All the parts are advantageously prefabricated and the assembling of the conductors does not require either welding or fastening with screws. The support blocks can be fastened in any desired manner to the track beam, but in accordance with one development of the invention, they are themselves inserted by force in a suitable dovetail-shaped recess.

In accordance with another development of the invention, the electric continuity between two successive conductors is also assured without welding or bolting by making use of the clamping force of the support blocks on the conductors to apply against them splice plates or contact bars which assure electric continuity. The connecting of the feed wires of the conductors may advantageously be effected by clamps or pins which can also be rapidly and easily mounted.

Other advantages and characteristics of the invention will become evident from the following description of several embodiments of the invention which are given by way of illustration and not of limitation in the accompanying drawings, in which:

FIG. 1 is a longitudinal section through a conveyor device in accordance with the invention, along the line I—I of FIG. 2;

FIG. 2 is a cross-section along the line II—II of FIG. 1;

FIG. 3 is a view similar to that of FIG. 2 illustrating a variant embodiment of a conveyor device in accordance with the invention, shown in active position;

FIG. 4 shows the device of FIG. 3 in the stopped or braked position of the truck;

3

FIG. 5 is a schematic view in perspective, partially torn away, of a conveyor in accordance with the invention illustrating one method of feeding the truck with electricity;

FIG. 6 illustrates on a larger scale in cross-section a supporting insulating block for the conductor rails in accordance with FIG. 5;

FIG. 7 is a partial view in elevation of the feeding device at a point of connection between two conductors;

FIG. 8 is a partial lefthand view on a larger scale of FIG. 7;

FIG. 9 is a view similar to that of FIG. 7 of the device in a region of connection of the feed wires to the conductor rails;

FIG. 10 is a section along the line X—X of FIG. 9.

Referring to FIGS. 1 and 2, suspension members 10 fastened to masts or beams (not shown) support, by means of bolts 12, a U-shaped profile which has two vertical side flanges 16, 18 and a horizontal portion 14 forming the upper wall of a semi-closed box or tubular track designated in its entirety as 15 and defined laterally by two L-shaped profiles 20 and 22, each fastened to one of the flanges 16, 18 by bolts 24. The horizontal arms 26, 28 of the L beams 20, 22 face each other, leaving a central slot or gap 31 in between. There is thus produced a box track having a central slot 31 in its bottom wall, the flange lips 26, 28 lying on both sides of the slot 31 forming a double runway. Trucks or wheeled carriages 30 are shown schematically in the form of a U-shaped frame receiving two pairs of supporting rollers 32, 34 and at the level of each pair of rollers 32, 34 a guide roller 36, 38 with vertical axis which engages in the gap 31. The supporting rollers 32, 34 travel on the horizontal flanges 26 and 28 of the profiles 20 and 22, and the slot 31 permits passage of a suspension member 40 mounted below the frame 30.

The driving of each truck 30 is assured by a linear motor the armature or secondary element 42 of which consists of a plate of conductive material placed against and fastened to the bottom of the upper wall 14 with the interposition of a ferromagnetic plate 44 which serves as closure for the magnetic flux.

The armature plate or blade 42 and/or the ferromagnetic plate 44 can of course be eliminated if the upper wall 14 consists of a material which is capable of serving to close the lines of induced current and/or of magnetic flux.

The inductor or primary element 46 of the motor which is of block shape with its upper face extending parallel to the armature 42 is rigidly fastened to the frame 30 of the truck by two threaded rods or posts 48, 50 so as to provide a flat gap between the inductor 46 and the armature 42 which is suitable for the good operation of the linear electric motor while avoiding rubbing or mechanical contact between the stationary and moving parts 42 and 46 of the motor.

Between the side flanges 16, 18 of the U beam there is provided a space outside the tubular track 15 which can be closed by a cover 52 so as to form a housing or ducts for the feed cables (not shown) of the conveyor. The picking-up of the electric current for the feeding of the different trucks is effected, for instance, by brushes in the manner described in further detail with reference to FIGS. 5 to 10.

The mounting of the tubular track of the invention is particularly simple, as certain parts can even be pre-assembled on the ground before being placed in final position, and the constituent elements are standard shapes of simple manufacture.

Furthermore, the track adapts itself to all desired paths of travel, since the various structural shapes employed can be bent without difficulty. Furthermore, the outside appearance is particularly pleasing and no roughness can give rise to damage to mechanical parts or injury to persons. Furthermore, all fragile parts, including the cables, are fully protected and no part which is under electrical voltage is accessible to touch. Finally, the linear motor proper is arranged in a zone separate from that which assures the guiding and the travel of the trucks.

The handling device or conveyor shown in FIGS. 1 and 2 operates in the following manner:

The overhead track 15 is fastened to the super-structures and extends along the handling path which may comprise switches, curves or inclined planes, depending on the operating conditions. The load to be transported is fastened to the hook 40 of a truck 30 or, if its size or weight requires this, to two or more associated trucks 30, possibly by means of a pivoted swing bar. The feeding of the inductors 46 of the trucks 30 with electrical current produces a propulsive thrust which displaces the trucks 30 bearing the load along the track 15. The thrust and the speed of propulsion can of course be adjusted in the customary manner which is well known to those skilled in the art and the direction of travel can be reversed by interchanging two feed phases of the inductor. The displacement of trucks 30 moving on one and the same track can be synchronized. As the trucks are self-propelled, their number may be increased in accordance with the desired capacity without any change in the installation, which permits extremely flexible conditions of operation and application.

FIGS. 3 and 4 illustrate a variant embodiment of the handling device of the invention having an incorporated braking device and for reasons of clarity in description, the same references numbers are used to designate parts which are identical or similar to those shown in FIGS. 1 and 2. The track 15 of semi-closed section may be identical to the track illustrated in FIGS. 1 and 2 or of any other type, for instance of rectangular section, on the bottom wall 26 and 28 of which the supporting rollers 32 of the trucks 30 rest and move. The linear motor driving each truck comprises an inductor 46 borne by the truck and an armature 42 fastened flat against a flat iron 44 which in its turn is fastened against the upper wall 14 of the track 15 to assure the closing of the magnetic circuit. The assembly consisting of the adjacent plates 14, 42 and 44 can of course be replaced in the manner described above by one or more plates of suitable characteristics.

The inductor 46 is connected to the truck 30 by one or more vertical rods or posts such as 54, each freely passing through a hole 56 in the chassis of the truck 30. A coil compression spring 58 is arranged between a nut 60 screwed onto the lower end—threaded for this purpose—of the rod 54 and the lower face of the truck 30. This spring 58 therefore tends to move the indicator 46 away from the armature 42, but it is calibrated with a force less than the force of electromagnetic attraction which tends to bring the armature 42, 44 and the inductor 46 together when the latter is fed with current. The inductor 46 is rigidly connected for translation along the track 15 with the truck 30 but has a degree of freedom of vertical movement, due to the sliding posts 54, of ascent and of descent, towards or away from the ceiling 14 of the track 15. In order to avoid the inductor 46 and the armature 42 sticking together under the effect of the electromagnetic forces of attraction which act in well known manner between said parts when the inductor 46 is fed, the latter bears at its upper portion positioning rollers 62 which protrude upward and which roll in the high position of the inductor 46 (see FIG. 3) against the flat iron 44 connected with the track 15 so as to maintain the upper face of the inductor 46 at the distance from the flat iron 44 which corresponds to the thickness of the gap desired for the rational operation of the motor.

The inductor block 46 bears at its lower portion facing the supporting rollers 32 shoes 64 which may come to rest on the rollers 32 of the truck 30 when the inductor 46 is in low position.

The operation of the conveyor shown in FIGS. 3 and 4 is as follows:

In position of rest, as illustrated in FIG. 4, the inductor 46 is in lowered position under the effect of its weight and the action of the spring 58, the brake shoes 64 resting against the runway surfaces of the supporting rollers 32. The truck 30 is thus immobilized and any undesired displacement, for instance due to a declivity of the track 15, is avoided.

When the inductor 46 of the linear motor is fed with suitable electric current, a force of attraction is on the one hand produced which tends to decrease the gap of the motor which lifts the inductor 46 against the action of the spring 58 which is of lower force and brings the rollers 62 against the upper wall 44 of the track 15 and on the other hand a propulsive force tending to displace the inductor 46 and the truck 30 which is rigidly connected in this direction by the posts 54 with the inductor 46 along the track 15. The lifting of the inductor 46 frees the brake shoes 64 and the supporting rollers 32 can then turn freely, no longer interfering with the displacement of the truck 30. The positioning rollers 62 can of course rest on the armature plate 42 or on the upper wall 14 of the track 15 or on any other part which is rigidly connected with the armature 42, but it should be noted that the fact that they are arranged in the vicinity of the gap of the motor, in the region where the electromagnetic forces originate, makes it possible to determine precisely the value of the gap of the motor and to maintain it constant along the entire track 15, despite the irregularities of the latter which may result, for instance, from a downward deformation of the flanges which form the runway.

As soon as the feeding of the inductor 46 is interrupted, the latter moves downward and the shoes 64 which may have a friction lining apply against the rollers 32 so as to brake the movement thereof and stop the truck 30.

The positioning effect of the inductor 46 by rollers 62 has been described in combination with the braking effect exerted by shoes 64, but it is obvious that they can very well be used independently of each other, the lifting movement of the inductor 46 and of the brake shoes 64 being, for instance, limited by a stop (not shown) provided on the post 54 in the case of an independent braking system or, conversely, the inductor block 46 being shaped in such a manner as not to come into contact with the rollers 32 when only the correct positioning of the inductor with respect to the armature is sought.

The movable connection of the inductor 46 and the truck 30 may be effected in any other operative manner, for instance by fixed posts or slides. It should be noted that the structural shape of the track 15 in accordance with the invention makes it possible to dissociate from each other the electrical and mechanical functions of the latter and that in the embodiment of the invention shown in FIGS. 3 and 4, this dissociation is also effected for the truck 30, the electrical driving function being represented by the inductor 46, while the load supporting function is taken over by the truck 30, only a thrust transmission connection connecting the two elements 30, 46 which can easily be designed not to affect the good operation of either of these parts.

FIGS. 5 to 10 illustrate a device for feeding current to the self-propelling trucks 30 moving within the track 15. The inductor 46 borne by the truck 30 is fed by a current pick-up device from fixed conductors 120, 120', 120'' in the form of rails or bars which extend along the track or beam 15. The fixed conductors 120, 120', 120'', three of which are contained in the example shown in the figures but which could be present in a greater or lesser number depending on the type of motor fed, are fastened to a side face 121 of the beam or track 15 by insulating supports 122, 124, etc., which are spaced apart and staggered along the track 15. They can of course be rigidly connected with the upper wall of the beam 15 or be distributed over the two side faces.

The truck 30 bears a support 126 facing the conductors 120, 120', 120'', in which support there are housed pick-up members 128, 128', 128'', such as brushes or the like, which cooperate with the conductors 120, 120', 120'' against which they are urged by any suitable pressing means.

The side face 121 has a tongue 130 fastened to—or in the case of a cast article preferably cast integral with—the beam 15 which, seen in cross-section of the beam 15, protrudes at a slight incline (see FIG. 6) and defines, together with the lower flange 26 which has a slightly inclined protrusion 131 and the wall 121, a housing with reduced opening of the form of a dovetail into which the insulating support block 122, 124 of elastic or flexible material and suitable dimension is inserted by force. This insertion is easily effected and the block 122, 124 is held in its housing by the narrowed opening. The tongue 130 and the protrusion 131 advantageously extend over the entire length of the track so as to permit the blocks 122, 124 being located at any desired place. The insulating block 122, 124 is provided on its front face, opposite the face in contact with the side wall 121, with longitudinal grooves or notches 132, 132', 132'' of a cross-section adapted to that of the conductors 120, 120', 120'' which can be housed therein with a force-fit. The force-fit of the conductors is sufficient to hold them in place. The depth of the notches 132, 132', 132'' is preferably slightly greater than that of the conductors 120, 120', 120'' which fully penetrate therein so as to avoid any lateral protrusion on which there might deposit and accumulate conductive dusts creating leakage lines, for instance due to wear of the conductors or of the upper pick-up members. The edges 134 of the grooves 132, 132', 132'' are beveled so as to provide a clearance chamfer which facilitates the introduction of the conductors and a contacting of the brushes 128, 128', 128'' even in case of a slight misalignment.

FIGS. 7 and 8 illustrate a manner in accordance with the invention of connecting two successive conductor rails or bars 120a, 120b. Over the place of connection there is arranged a support block 136 similar to the blocks 122, 124 described above but having widened notches 138 permitting the insertion between the lips of the notch and the conductor 120a, 120b of connecting plates or straps 140, 142 which surround the conductor and overlap the ends of the conductors 120a, 120b to assure electrical continuity. The force-fit in the block 136 is sufficient for good electrical contact between the plates 140, 142 and the conductors 120a, 120b. Between the ends of the conductors 120a, 120b there is provided an expansion gap 144 and the ends of the conductors are cut in a bevel or splay 146, 148 to avoid any sudden dip or discontinuity of the feed. The width of the current pick-ups 128, 128', 128'' is preferably slightly greater than that of the conductors so as to come into contact with the lateral splice plates 140, 142 which thus participate in the conducting and transfer of the current.

FIGS. 9 and 10 illustrate a preferred manner in accordance with the invention of connecting the conductors 120, 120', 120'' to a feed cable 150 which is, for instance, connected to the power line. In the side wall 121 of the beam 15 there is provided—in an area located between two support blocks 122, 124—an orifice 152 into which there is introduced a cable end 154 of a shape appropriate for the shape of the orifice 152. The wires 156, 156', 156'' of the cable 150 terminate in clamps or spring terminals 158, 158', 158'' which are fastened directly on the associated conductors 120, 120', 120''. Any other manner of connection can of course be used, for instance of the type having a pin rigidly connected with the conductor, on which a female connector of the wire is placed. The rapid connection of the wires of the cable 150 is effected without welding and in a very simple manner, which permits a large number of points of feed distributed along the track, and in particular the subdividing of the circuit into sections with independent feed.

It is needless to take up again here the operation of the conveyor which has been described in detail above. The mounting of the feed device is effected in the following manner:

The blocks 122, 124 are force-fitted between the tongues 130, 131, the distance between two successive blocks being adapted to the rigidity of the conductors to be fastened. The conductors 120, 120', 120" are then introduced into the respective notches 132, taking care to push them in all the way so that their edge does not touch the insulating support block. At connecting point there is arranged a block 136 with widened notches 138 which receive both the conductors 120a, 120b and the side plates 140, 142 which assure the electrical contact. An expansion joint 144 is provided between the ends of the conductors. The feeding of the conductors 120, 120', 120" is effected by the cable 150 which enters through a window 152 provided upon the mounting or arranged in advance in the side wall 121 of the beam 15. The wires of the cable 150 are clipped on the conductors 120, 120', 120" or on terminals provided for this purpose. It is easy to understand that the mounting is extremely simple and rapid and that all of the elements can be prefabricated. The conductive rails 120, 120', 120" are held rigidly due to their force-fit in the notches 132 and the current pick-ups 128 tend to push them into said notches upon the passing of each truck 30.

The handling device with self-propelled trucks within a rail of semi-closed cross-section in accordance with the invention is of particularly simple construction and of absolute reliability in operation. The use of standard prefabricated elements makes the manufacture and the mounting thereof very easy.

What is claimed is:

1. A linear indication motor conveyor assembly comprising a truck unit, conveyor rail means defining a first track for supporting and guiding said truck unit, a linear induction motor magnetic field structure and armature structure, one of said structures being carried by said truck unit, the other structure extending along said rail means to define wall means extending substantially parallelly to said first track, said one structure having an end portion facing said wall means to define gap means therebetween, said magnetic field structure being adapted to produce a moving magnetic field in said gap means causing said truck unit to move along said rail means, guide means on said truck unit to guide said one structure for movement on said truck unit towards and away from said other structure, said rail means comprising a second track adjacent said other structure, said one structure. including spacer means adapted to engage said second track so as to independently determine the spacing between said wall means and said end portion.

2. An assembly as claimed in claim 1, said spacer means comprising roller means.

3. An assembly as claimed in claim 1, said spacer means and said second track being adapted to maintain a spacing of constant magnitude between said wall means and said end portion.

4. A linear induction motor conveyor assembly comprising a truck unit, a hollow conveyor rail having upwardly facing lower flange means for supporting and guiding said truck unit and downwardly facing upper armature plate means extending substantially parallelly to said flange means, a magnetic field structure on said truck unit having upwardly facing upper pole face means defining with confronting portions of said armature plate means gap means in which said magnetic field srtucture produces a moving magnetic field causing said truck unit to move along said rail, guide means on said truck unit to guide said magnetic field srtucture for movement on said truck unit in a direction towards and away from said armature plate means, and spacer means acting between said magnetic field structure and a downwardly facing upper portion of said rail to fix the spacing between said armature plate and said pole face means independently of irregularities of said lower flange means when said magnetic field structure and said armature plate means are in mutually attracted relation under the action of said magnetic field upon energizing of said magnetic field structure.

5. An assembly as claimed in claim 4, said spacer means comprising roller means cooperating with track means.

6. A linear induction motor conveyor assembly comprising a stationary track, a wheeled truck unit adapted for rolling movement on said track, a stationary armature structure extending above said track and said truck unit substantially parallelly to said track, a linear motor magnetic field structure extending above the wheel means of said truck unit and having upper pole means facing said armature structure, said magnetic field structure being adapted to generate, when energized, a moving magnetic field between said pole face means and said armature structure causing said truck unit to move along said track, guide means on said truck unit to guide said magnetic field structure for movement towards and away from said armature structure, spacer means acting between said magnetic field structure and said armature structure to maintain a predetermined spacing therebetween when said structures are in mutually attracted condition upon energizing of said magnetic field structure, said magnetic field structure comprising friction means adapted to engage said wheel means upon de-energizing of said magnetic field structure, causing braking of said truck unit.

References Cited
UNITED STATES PATENTS

| | | | |
|---|---|---|---|
| 2,728,819 | 12/1955 | Hauss | 191—23 A |
| 3,142,368 | 7/1964 | Roney | 191—45 A |
| 3,225,228 | 12/1965 | Roshala | 104—148 LM |
| 3,233,559 | 2/1966 | Smith et al. | 104—148 LM |
| 3,374,823 | 3/1968 | Ford | 310—13 |
| 3,426,887 | 2/1969 | Ward et al. | 310—13 |

DRAYTON E. HOFFMAN, Primary Examiner

U.S. Cl. X.R.

310—13